(12) United States Patent
Condon et al.

(10) Patent No.: US 9,296,926 B2
(45) Date of Patent: Mar. 29, 2016

(54) OVERLAMINATE FILMS AND GRAPHIC ARTICLES CONTAINING THEM

(75) Inventors: Robert R. Condon, Woodbury, MN (US); Chih Chung Hsu, Woodbury, MN (US)

(73) Assignee: 3M Inovative Properties Company, St. Paul, MN (US)

( * ) Notice: Subject to any disclaimer, the term of this patent is extended or adjusted under 35 U.S.C. 154(b) by 382 days.

(21) Appl. No.: 13/051,523

(22) Filed: Mar. 18, 2011

(65) Prior Publication Data
US 2011/0236648 A1 Sep. 29, 2011

Related U.S. Application Data

(60) Provisional application No. 61/317,737, filed on Mar. 26, 2010.

(51) Int. Cl.
| | | |
|---|---|---|
| *B32B 3/10* | (2006.01) | |
| *B32B 37/10* | (2006.01) | |
| *B32B 38/14* | (2006.01) | |
| *C09J 7/02* | (2006.01) | |

(52) U.S. Cl.
CPC ............... *C09J 7/0296* (2013.01); *B32B 3/10* (2013.01); *C09J 2201/162* (2013.01); *C09J 2201/606* (2013.01); *C09J 2427/006* (2013.01); *C09J 2433/006* (2013.01); *Y10T 156/10* (2015.01); *Y10T 428/24802* (2015.01)

(58) Field of Classification Search
None
See application file for complete search history.

(56) References Cited

U.S. PATENT DOCUMENTS

| | | | |
|---|---|---|---|
| 2,736,721 A | 2/1956 | Dexter | |
| 3,437,622 A | 4/1969 | Dahl | |
| 3,578,622 A | 5/1971 | Brown | |
| 3,718,712 A | 2/1973 | Tushaus | |
| 5,209,971 A | 5/1993 | Babu | |
| 5,214,119 A | 5/1993 | Leir | |
| 5,591,820 A | 1/1997 | Kydonieus | |
| 5,965,256 A * | 10/1999 | Barrera | 428/354 |
| 6,551,432 B1 | 4/2003 | Spain | |
| 6,872,435 B2 | 3/2005 | Bull | |
| 6,905,756 B2 | 6/2005 | Yamamoto | |
| 7,101,616 B2 * | 9/2006 | Arney et al. | 428/323 |
| 2002/0150763 A1 * | 10/2002 | Silagy et al. | 428/421 |
| 2007/0036929 A1 | 2/2007 | Baird | |
| 2008/0017301 A1 | 1/2008 | Emslander | |

FOREIGN PATENT DOCUMENTS

| | | |
|---|---|---|
| EP | 0467570 | 1/1992 |
| WO | WO94/03337 * | 2/1994 |
| WO | WO 00-75210 | 12/2000 |
| WO | WO 2008/002953 | 1/2008 |

OTHER PUBLICATIONS

Original Translation of EP 0467570.*

* cited by examiner

*Primary Examiner* — Gerard Higgins
*Assistant Examiner* — Sathavaram I Reddy
(74) *Attorney, Agent, or Firm* — Jeffrey M. Olofson

(57) ABSTRACT

Multilayer graphic articles include a graphic substrate, and an overlaminate film laminated to the graphic substrate. The overlaminate film includes a transparent film layer with a fluorochemical-containing acid-resistant layer coated on at least a portion of one surface, and an adhesive layer coated on at least a portion of the opposite surface of the transparent film. The transparent film layer may be a vinyl film layer. The acid resistant layer includes a blend of at least one fluoropolymer and at least one acrylate resin.

13 Claims, No Drawings

OVERLAMINATE FILMS AND GRAPHIC ARTICLES CONTAINING THEM

CROSS REFERENCE TO RELATED APPLICATION

This application claims the benefit of U.S. Provisional Patent Application No. 61/317,737, filed Mar. 26, 2010, the disclosure of which is incorporated by reference herein in its entirety.

FIELD OF THE DISCLOSURE

The present disclosure relates to film articles, especially film articles that contain overlaminate films.

BACKGROUND

A wide variety of graphic articles are used for a number of different purposes including to provide information, for advertising and for decoration. Often the graphic articles include a film or multiple layers of film and an adhesive layer to adhere the graphic article to a substrate. Some or all of these layers of film may contain images, such as printed images, to generate the graphic pattern or design. If the printed portion of the graphic is on the external surface of the graphic article, it is exposed to the environment, whether the environment is indoors or outdoors, and is vulnerable to staining, graffiti, and other forms of damage.

To protect the printed images on graphic articles a variety of different techniques have been developed. One technique is to place the printed surface on an interior rather than an exterior surface. This can be achieved, for example, by printing the graphic design onto a backing film and overlaying the printed layer with an adhesive layer. In this way, when the graphic article is attached to a substrate, the printed surface is not exposed to the external environment. There are drawbacks to this technique, however. The backing film must be very optically transparent to permit clear viewing of the printed surface. Additionally, coating of the adhesive layer over the printed surface can be a time consuming and labor intensive operation unsuitable for many uses and may required specialized equipment unavailable to small scale users. For example, the advances in digital printing technology has permitted a wide variety of users to be able to print customized images onto graphic films with a relatively low capital outlay for equipment. Adhesive coaters, however, are much more labor and capital intensive.

Another method of generating a graphic article in which the printed image or design is protected, is to place a protective layer over the graphic article. This protective layer can be a coating, a substrate, or a film. When it is a film it is sometimes referred to as an overlaminate film. The use of coatings may be impractical in many instances because placing a coating onto a printed surface can be a time consuming and labor intensive operation unsuitable for many uses and may required specialized equipment unavailable to small scale users. Similarly, the use of substrates such as glass or plastic plates or sheets, may be impractical or even impossible. For example, if the graphic needs to be flexible enough to bend (if used on the surface of a vehicle for example), covering the graphic with a substrate is not possible. The use of overlays can provide protection to a graphic image without the bulk and rigidity of a substrate layer.

SUMMARY

Graphic articles and methods of preparing graphic articles are disclosed. The graphic articles comprise overlaminate films. Disclosed are articles comprising a graphic substrate, and an overlaminate film laminated to the graphic substrate. The overlaminate film comprises a transparent film layer comprising a first major surface and a second major surface, with a fluorochemical-containing acid-resistant layer coated on at least a portion of the first major surface of the transparent film, and an adhesive layer coated on at least a portion of the second major surface of the transparent film. In some embodiments, the transparent film comprises a vinyl film. The acid resistant layer comprises a blend of at least one fluoropolymer and at least one acrylate resin. The overlaminate film has an elongation at room temperature of at least 50%.

Also disclosed are methods for preparing graphic articles. Methods of preparing a graphic article comprise providing a graphic substrate, providing an overlaminate film, and laminating the overlaminate film to the graphic substrate to form a graphic article. The overlaminate film comprises a transparent film layer with a first major surface and a second major surface, with an acid-resistant layer coated on at least a portion of the first major surface of the transparent film, and an adhesive layer coated on at least a portion of the second major surface of the transparent film. In some embodiments, the transparent film comprises a vinyl film. The acid resistant layer comprises a blend of at least one fluoropolymer and at least one acrylate resin. The overlaminate film has an elongation at about room temperature of at least 50%.

DETAILED DESCRIPTION

Graphic films are used in a wide range of applications, including applications in which the graphics are exposed to the environment. Often the environment can cause damage or wear on the graphic film. In some instances, a cover film such as an overlaminate film is used to protectively cover the graphic film. Besides being environmentally resistant, a variety of demands are placed upon overlaminate films. For example, the overlaminate film should be sufficiently transparent to not obscure the graphic film, and should be comparable to the graphic film in flexibility and stretchability such that the overlaminate will not hinder these properties in the graphic film. In particular, since graphic films are often prepared from vinyl polymers, the overlaminate films should have elongation properties that are able to approximate these vinyl polymers. Also, since many graphic articles can be large, it is desirable for the overlaminate films to be relatively inexpensive and easy to apply to the graphic articles.

One particular environmental issue relates to resistance to polluted air. Some air pollutants can form acid rain. The acidic rain can cause staining of graphic articles, even graphic articles that contain an overlaminate layer. A similar environmental issue is "acid dew". In some polluted environments, acidic dew can form on exposed surfaces during the night time hours when air temperatures decrease. The dew can cling to the surface for long periods of time, for example, until the dew evaporates, and can cause staining of the surface. When the surface contains a graphic article, such as a motor vehicle graphic, the acid dew staining can be aesthetically unpleasing.

Presented in this disclosure are multi-layer articles that comprise film articles, such as graphic film articles, with overlaminate films that are acid resistant. The overlaminate films comprise a transparent film with a first major surface and a second major surface. In some embodiments, the transparent film comprises a vinyl film. The overlaminate film has an acid-resistant layer coated on at least a portion of the first major surface of the transparent film. The acid resistant layer comprises a blend of at least one fluoropolymer and at least one acrylate polymer. An adhesive layer is coated on at least a portion of the second major surface of the transparent film.

The graphic articles of this disclosure can be used for a wide variety of substrates, including: building surfaces such as walls, ceilings and windows; vehicle surfaces such as motor vehicles (automobiles, motorcycles, semi trailers, and the like), trains, and aircraft; and graphic display surfaces.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

As used herein, the term "polymer" will be understood to include polymers, copolymers (e.g., polymers formed using two or more different monomers), oligomers and combinations thereof.

As used herein, the term "multi-layer article" refers to an article which contains more than one layer. The layers generally comprise different materials.

As used herein, the term "graphic article" refers to an article which contains a graphic image. The graphic article may also contain additional layers such as an adhesive layer to adhere the graphic article to a substrate.

As used herein, the term "overlaminate film" refers to a film article designed to be laminated to a graphic article to protect the surface of the graphic article.

Unless otherwise indicated, "optically transparent" refers to an article, film or adhesive that has a high light transmittance over at least a portion of the visible light spectrum (about 400 to about 700 nm). The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Unless otherwise indicated, "optically clear" refers to an article, film or adhesive that has a high light transmittance over at least a portion of the visible light spectrum (about 400 to about 700 nm), and that exhibits low haze.

As used herein, the terms "room temperature" or "ambient temperature" are used interchangeably and refer to a temperature of from about 20° C. to about 25° C., more typically about 22° C. (72° F.).

The term "adhesive" as used herein refers to polymeric compositions useful to adhere together two adherends. Examples of adhesives are non-tacky adhesives (i.e., cold-seal adhesives), heat activated adhesives, and pressure sensitive adhesives.

Non-tacky adhesives have limited or low tack to most substrates but can have acceptable adhesive strength when paired with specific target substrates or when two layers of the non-tacky adhesives are contacted. The non-tacky adhesive adheres by affinity.

Heat activated adhesives are non-tacky at room temperature but become tacky and capable of bonding to a substrate at elevated temperatures. These adhesives usually have a glass transition temperature ($T_g$) or melting point ($T_m$) above room temperature. When the temperature is elevated above the $T_g$ or $T_m$, the storage modulus usually decreases and the adhesive become tacky.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

As used herein, the term "acrylate resin" refers to at least one (meth)acrylate polymer or copolymer and may include a blend of different (meth)acrylate polymers and copolymers.

The term "(meth)acrylate" refers to monomeric acrylic or methacrylic esters of alcohols. Acrylate and methacrylate monomers are referred to collectively herein as "(meth)acrylate" monomers. Polymers prepared from (meth)acrylate monomers are referred to as (meth)acrylate polymers.

As used herein, the term "ethylenically unsaturated" when used to described monomers or groups refers to monomers or groups that contain terminal ethylene groups ($H_2C=CH-$).

The term "fluorochemical-containing" when used in conjunction with a polymer, copolymer, group, or layer, refers to having at least one hydrogen atom replaced with a fluorine atom. Typically, fluorochemical-containing polymers and copolymers are referred to as "fluoropolymers" and have all or nearly all of the hydrogen atoms replaced with fluorine atoms.

Multi-layer articles are disclosed which comprise a graphic substrate and an overlaminate film. The graphic substrate typically is a graphic film article, but in some instances may be a rigid polymeric or rigid non-polymeric substrate or film. The graphic film article may itself be a multi-layer article. Typically, the graphic film article comprises at least a base film on which a graphic image or design is present on one surface and an adhesive layer is present on the opposite surface.

The base film can be formed from a variety of different materials. In many embodiments, the base film is a thermoplastic polymer film such as, for example, a polyolefin, polyester, polyamide, and/or polycarbonate film. In some embodiments, the graphic substrate is a vinyl film such as, for example, a polyvinyl chloride (PVC) film, a PVC blend film, or a plasticized PVC film. In some embodiments, the base film may contain colorants to provide a uniform background colored film.

The base film may contain a variety of coatings or surface treatments. Among the suitable surface treatments that can be applied to one or both surfaces of the base film are, for example, corona treatment, plasma treatment or flame treatment. Useful coatings include, for example, primer coatings such as chemical primer layers, ink receptive coatings, and the like. Suitable chemical primer layers may be selected from urethanes, silicones, epoxy resins, vinyl acetate resins, ethyleneimines, and the like. Examples of chemical primers for vinyl and polyethylene terephthalate films include crosslinked acrylic ester/acrylic acid copolymers disclosed in U.S. Pat. No. 3,578,622. The thickness of the chemical primer layer is typically within the range of 10 to 3,000 nanometers (nm). Examples of ink receptive coatings include transparent thermoplastic polymers such as, for example transparent polyacrylates and derivatives thereof. Other suitable thermoplastic polymers include, but are not limited to, polypropylene, polyacetal, polyamide, polyester, polystyrene, polyvinyl chloride, polyvinylidene chloride, polyurethane, polyurea, and the like. The thickness of the ink receptive thermoplastic layer can be any useful thickness, typically ranging from 0.5 to 20 micrometers.

Typically the base film has a graphic image or design present on it or in it. In some embodiments, the graphic image or design is printed on a surface of the base film. The image described herein can be formed on the base film via any useful printing method such as, for example, a solvent based or water based ink jet printing process, a thermal mass transfer printing process, electrostatic printing, gravure printing, offset printing, screen printing, and the like.

Generally the base film has an adhesive layer to attach the graphic film article to a substrate. A wide variety of adhesives may be used for this adhesive layer including non-tacky adhesives (i.e., cold-seal adhesives), heat activated adhesives, and pressure sensitive adhesives. In some embodiments, pressure sensitive adhesives are used. Useful pressure sensitive adhesives include those based on natural rubbers, synthetic rubbers, styrene block copolymers, polyvinyl ethers, acrylics, poly-$\alpha$-olefins, silicones, urethanes or ureas.

Useful natural rubber pressure sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include but are not limited to wood rosin and its hydrogenated derivatives; terpene resins of various softening points, and petroleum-based resins, such as, the "ESCOREZ 1300" series of $C_5$ aliphatic olefin-derived resins from Exxon, and "PICCOLYTE S" series, polyterpenes from Hercules, Inc. Antioxidants are used to retard the oxidative attack on natural rubber, which can result in loss of the cohesive strength of the natural rubber adhesive. Useful antioxidants include but are not limited to amines, such as N—N' di-$\beta$-naphthyl-1,4-phenylenediamine, available as "AGERITE D"; phenolics, such as 2,5-di-(t-amyl)hydroquinone, available as "SANTOVAR A", available from Monsanto Chemical Co., tetrakis[methylene-3-(3',5'-di-tert-butyl-4'-hydroxyphenyl)propionate]methane, available as "IRGANOX 1010" from Ciba-Geigy Corp., and 2-2'-methylenebis(4-methyl-6-tert butyl phenol), available as Antioxidant 2246; and dithiocarbamates, such as zinc dithiodibutyl carbamate. Other materials can be added to natural rubber adhesives for special purposes, such as plasticizers, pigments, and curing agents to partially vulcanize the pressure sensitive adhesive.

Another useful class of pressure sensitive adhesives are those comprising synthetic rubber. Such adhesives are generally rubbery elastomers, which are either self-tacky or non tacky and require tackifiers. Self-tacky synthetic rubber pressure sensitive adhesives include for example, butyl rubber, a copolymer of isobutylene with less than 3 percent isoprene, polyisobutylene, a homopolymer of isoprene, polybutadiene, such as "TAKTENE 220 BAYER". Butyl rubber pressure sensitive adhesives often contain an antioxidant such as zinc dibutyl dithiocarbamate. Polyisobutylene pressure sensitive adhesives do not usually contain antioxidants. Synthetic rubber pressure sensitive adhesives, which generally require tackifiers, are also generally easier to melt process. They comprise polybutadiene or styrene/butadiene rubber, from 10 parts to 200 parts of a tackifier, and generally from 0.5 to 2.0 parts per 100 parts rubber of an antioxidant such as "IRGANOX 1010". An example of a synthetic rubber is "AMERIPOL 1011A", a styrene/butadiene rubber available from BF Goodrich. Tackifiers that are useful include derivatives of rosins such as "FORAL 85", a stabilized rosin ester from Hercules, Inc., the "SNOWTACK" series of gum rosins from Tenneco, and the "AQUATAC" series of tall oil rosins from Sylvachem; and synthetic hydrocarbon resins such as the "PICCOLYTE A" series, polyterpenes from Hercules, Inc., the "ESCOREZ 1300" series of $C_5$ aliphatic olefin-derived resins, the "ESCOREZ 2000" Series of $C_9$ aromatic/aliphatic olefin-derived resins, and polyaromatic $C_9$ resins, such as the "PICCO 5000" series of aromatic hydrocarbon resins, from Hercules, Inc. Other materials can be added for special purposes, including hydrogenated butyl rubber, pigments, plasticizers, liquid rubbers, such as "VISTANEX LMMH" polyisobutylene liquid rubber available from Exxon, and curing agents to vulcanize the adhesive partially.

Styrene block copolymer pressure sensitive adhesives generally comprise elastomers of the A-B or A-B-A type, where A represents a thermoplastic polystyrene block and B represents a rubbery block of polyisoprene, polybutadiene, or poly (ethylene/butylene), and resins. Examples of the various block copolymers useful in block copolymer pressure sensitive adhesives include linear, radial, star and tapered styrene-isoprene block copolymers such as "KRATON D1107P", available from Shell Chemical Co., and "EUROPRENE SOL TE 9110", available from EniChem Elastomers Americas, Inc.; linear styrene-(ethylene-butylene) block copolymers such as "KRATON G1657", available from Shell Chemical Co.; linear styrene-(ethylene-propylene) block copolymers such as "KRATON G1750X", available from Shell Chemical Co.; and linear, radial, and star styrene-butadiene block copolymers such as "KRATON D1118X", available from Shell Chemical Co., and "EUROPRENE SOL TE 6205", available from EniChem Elastomers Americas, Inc. The polystyrene blocks tend to form domains in the shape of spheroids, cylinders, or plates that causes the block copolymer pressure sensitive adhesives to have two phase structures. Resins that associate with the rubber phase generally develop tack in the pressure sensitive adhesive. Examples of rubber phase associating resins include aliphatic olefin-derived resins, such as the "ESCOREZ 1300" series and the "WINGTACK" series, available from Goodyear; rosin esters, such as the "FORAL" series and the "STAYBELITE" Ester 10, both available from Hercules, Inc.; hydrogenated hydrocarbons, such as the "ESCOREZ 5000" series, available from Exxon; polyterpenes, such as the "PICCOLYTE A" series; and terpene phenolic resins derived from petroleum or terpentine sources, such as "PICCOFYN A100", available from Hercules, Inc. Resins that associate with the thermoplastic phase tend to stiffen the pressure sensitive adhesive. Thermoplastic phase associating resins include polyaromatics, such as the "PICCO 6000" series of aromatic hydrocarbon resins, available from Hercules, Inc.; coumarone-indene resins, such as the "CUMAR" series, available from Neville; and other high-solubility parameter resins derived from coal tar or petroleum and having softening points above about 85° C., such as the "AMOCO 18" series of alphamethyl styrene resins, available from Amoco, "PICCOVAR 130" alkyl aromatic polyindene resin, available from Hercules, Inc., and the "PICCOTEX" series of alphamethyl styrene/vinyl toluene resins, available from Hercules. Other materials can be added for special purposes, including rubber phase plasticizing hydrocarbon oils, such as, "TUFFLO 6056", available from Lydondell Petrochemical Co., Polybutene-8 from Chevron, "KAYDOL", available from Witco, and "SHELLFLEX 371", available from Shell Chemical Co.; pigments; antioxidants, such as "IRGANOX 1010" and "IRGANOX 1076", both available from Ciba-Geigy Corp., "BUTAZATE", available from Uniroyal Chemical Co., "CYANOX LDTP", available from American Cyanamid, and "BUTASAN", available from Monsanto Co.; antiozonants, such as "NBC", a nickel dibutyldithiocarbamate, available from DuPont; liquid rubbers such as "VISTANEX LMMH" polyisobutylene rubber; and ultraviolet light inhibitors, such as "IRGANOX 1010" and "TINUVIN P", available from Ciba-Geigy Corp.

Polyvinyl ether pressure sensitive adhesives are generally blends of homopolymers of vinyl methyl ether, vinyl ethyl ether or vinyl iso-butyl ether, or blends of homopolymers of vinyl ethers and copolymers of vinyl ethers and acrylates to achieve desired pressure sensitive properties. Depending on the degree of polymerization, homopolymers may be viscous oils, tacky soft resins or rubber-like substances. Polyvinyl ethers used as raw materials in polyvinyl ether adhesives include polymers based on: vinyl methyl ether such as "LUTANOL M 40", available from BASF, and "GANTREZ M 574" and "GANTREZ 555", available from ISP Technologies, Inc.; vinyl ethyl ether such as "LUTANOL A 25", "LUTANOL A 50" and "LUTANOL A 100"; vinyl isobutyl ether such as "LUTANOL 130", "LUTANOL 160", "LUTANOL IC", "LUTANOL 160D" and "LUTANOL 165D"; methacrylate/vinyl isobutyl ether/acrylic acid such as "ACRONAL 550 D", available from BASF. Antioxidants useful to stabilize the polyvinylether pressure sensitive adhesive include, for example, "IONOX 30" available from Shell, "IRGANOX 1010" available from Ciba-Geigy, and antioxidant "ZKF" available from Bayer Leverkusen. Other materials can be added for special purposes as described in BASF literature including tackifier, plasticizer and pigments.

Acrylic pressure sensitive adhesives generally have a glass transition temperature of about −20° C. or less and may comprise from 100 to 80 weight percent of a $C_3$-$C_{12}$ alkyl ester component such as, for example, isooctyl acrylate, 2-ethyl-hexyl acrylate and n-butyl acrylate and from 0 to 20 weight percent of a comonomer such as, for example, polar comonomers such as acrylic acid, methacrylic acid, ethylene vinyl acetate, and N-vinyl pyrrolidone or nonpolar comonomers such styrene macromer or isobornyl(meth)acrylate. Typically, the acrylic pressure sensitive adhesives comprise from 0 to 20 weight percent of acrylic acid and from 100 to 80 weight percent of isooctyl acrylate. The acrylic pressure sensitive adhesives may be self-tacky or tackified. Useful tackifiers for acrylics are rosin esters such as "FORAL 85", available from Hercules, Inc., aromatic resins such as "PICCOTEX LC-55WK", aliphatic resins such as "PICCOTAC 95", available from Hercules, Inc., and terpene resins such as α-pinene and β-pinene, available as "PICCOLYTE A-115" and "ZONAREZ B-100" from Arizona Chemical Co. Other materials can be added for special purposes, including hydrogenated butyl rubber, pigments, and curing agents to vulcanize the adhesive partially.

Poly-α-olefin pressure sensitive adhesives, also called a poly(1-alkene) pressure sensitive adhesives, generally comprise either a substantially uncrosslinked polymer or a uncrosslinked polymer that may have radiation activatable functional groups grafted thereon as described in U.S. Pat. No. 5,209,971 (Babu, et al). The poly-α-olefin polymer may be self tacky and/or include one or more tackifying materials. If uncrosslinked, the inherent viscosity of the polymer is generally between about 0.7 and 5.0 dL/g as measured by ASTM D 2857-93, "Standard Practice for Dilute Solution Viscosity of Polymers". In addition, the polymer generally is predominantly amorphous. Useful poly-α-olefin polymers include, for example, $C_3$-$C_{18}$ poly(1-alkene) polymers, typically $C_5$-$C_{12}$ α-olefins and copolymers of those with $C_3$ and more typically $C_6$-$C_8$ and copolymers of those with $C_3$. Tackifying materials are typically resins that are miscible in the poly-α-olefin polymer. The total amount of tackifying resin in the poly-α-olefin polymer ranges between 0 to 150 parts by weight per 100 parts of the poly-α-olefin polymer depending on the specific application. Useful tackifying resins include resins derived by polymerization of $C_5$ to $C_9$ unsaturated hydrocarbon monomers, polyterpenes, synthetic polyterpenes and the like. Examples of such commercially available resins based on a $C_5$ olefin fraction of this type are "WINGTACK 95" and "WINGTACK 15" tackifying resins available from Goodyear Tire and Rubber Co. Other hydrocarbon resins include "REGALREZ 1078" and "REGALREZ 1126" available from Hercules Chemical Co., and "ARKON P115" available from Arakawa Chemical Co. Other materials can be added for special purposes, including antioxidants, fillers, pigments, and radiation activated crosslinking agents.

Silicone pressure sensitive adhesives comprise two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups (OSiMe$_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif. Manufacture of typical silicone pressure sensitive adhesives is described in U.S. Pat. No. 2,736,721 (Dexter). Manufacture of silicone urea block copolymer pressure sensitive adhesive is described in U.S. Pat. No. 5,214,119 (Leir, et al). Other materials can be added for special purposes, including, pigments, plasticizers, and fillers. Fillers are typically used in amounts from 0 parts to 10 parts per 100 parts of silicone pressure sensitive adhesive. Examples of fillers that can be used include zinc oxide, silica, carbon black, pigments, metal powders and calcium carbonate.

Polyurethane and polyurea pressure sensitive adhesives useful in this disclosure include, for example, those disclosed in WO 00/75210 (Kinning et al.) and in U.S. Pat. No. 3,718,712 (Tushaus); U.S. Pat. No. 3,437,622 (Dahl); and U.S. Pat. No. 5,591,820 (Kydonieus et al.).

The adhesive layer may optionally include a release liner to protect the adhesive layer from premature adhesion as well as dirt or other contaminants. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface. The use of a microstructured liner can be particularly useful with large scale graphic articles, since the microstructured surface imparted to the adhesive layer can aid in preventing bubble formation during lamination of the article by permitting air egress.

The multi-layer articles of this disclosure comprise an overlaminate film laminated to the graphic substrate. The overlaminate film is itself a multi-layer construction, comprising a carrier film with a first major surface and a second major surface. Generally, the carrier film has a fluorochemical-containing coating on one major surface and an adhesive layer on the second major surface. The carrier film may itself be a multi-layer film or it may contain additional layers or coatings.

The carrier film is a transparent film. Typically, when the overlaminate film is used with a graphic film article, the material composition of the carrier film is chosen to match the material composition or properties of the graphic film article. In many embodiments, the carrier film is a thermoplastic polymer film such as, for example, a polyolefin, polyester, polyamide, and/or polycarbonate film. In some embodiments, the graphic substrate is a vinyl film such as, for example, a polyvinyl chloride (PVC) film, a PVC blend film, or a plasticized PVC film. Typically the carrier film has a thickness of from about 10 to about 255 micrometers (0.5-10 mils).

The carrier film has a fluorochemical-containing coating on its first major surface. This coating provides desirable properties to the overlaminate film, including weather resistance, especially acid resistance. The fluorochemical-containing coating comprises a blend of at least one fluoropolymer and at least one acrylate resin. Examples of suitable fluorochemical-containing coatings are described, for example in European Patent Application EP 467,570 (Hsu et al.). Typically the fluorochemical-containing blend comprises 15-60 weight % fluoropolymer and 40-85 weight % acrylate resin. Even more typically, the fluorochemical-containing blend comprises 15-50 weight % fluoropolymer and 50-85 weight % acrylate resin or even 15-40 weight % fluoropolymer and 60-85 weight % acrylate resin.

In some embodiments, the fluoropolymer comprises a copolymer of vinylidene fluoride and a copolymerizable fluorochemical-containing monomer. Examples of suitable copolymerizable fluorochemical-containing monomers include, for example, tetrafluoroethylene, chlorotrifluoroethylene, monofluoroethylene, hexafluoropropylene, and fluoroalkyl vinyl ethers such as vinyl ethers with $C_1$ to $C_5$ fluoroalkyl groups. Hexafluoropropylene and chlorotrifluoroethylene are particularly suitable.

Typically, the fluoropolymer comprises 40-80 weight % vinylidene fluoride monomer and 20-60 weight % of one or more copolymerizable fluorochemical-containing monomer. In some embodiments, the fluoropolymer comprises 50-70 weight % vinylidene fluoride monomer and 30-50 weight % copolymerizable fluorochemical-containing monomer.

The acrylate resin typically comprises a (meth)acrylate copolymer. Generally the (meth)acrylate copolymer is comprised predominantly of methyl methacrylate monomer, but may also contain copolymerizable ethylenically unsaturated monomers. In some embodiments, the acrylate resin comprises 50 weight % or even 80 weight % methyl methacrylate monomer. Suitable copolymerizable ethylenically unsaturated monomers include, for example, ethyl acrylate, ethyl methacrylate, butyl acrylate, butyl methacrylate, octyl acrylate, octyl methacrylate, acrylamide, methacrylamide, N,N-dimethyl acrylamide, N,N-dimethylaminoethyl methacrylate, tetrhydrofurfuryl methacrylate, acrylonitrile, acrylic acid, methacrylic acid, styrene, and substituted styrenes.

The fluorochemical-containing coating may optionally contain additional additives. Among the suitable additional additives are viscosity controllers, antioxidants, hindered amine light stabilizers (HALS), dispersing agents, anti-foaming agents, wetting agents, leveling agents, and the like. These additives may be present in any suitable amount provided that such additives do not interfere with the desirable properties of the fluorochemical-containing coating.

Typically the fluorochemical-containing coating thickness is at least 1 micrometer, and generally no greater than 75 micrometers. More typically the thickness of the fluorochemical-containing layer is in the range of about 1-25 micrometers or even 2-5 micrometers.

Generally, the carrier film has an adhesive layer on the second major surface to adhere the carrier film to the graphic substrate. The adhesive typically is a pressure sensitive adhesive. Because the adhesive layer lies between the graphic substrate and the carrier film, the adhesive layer is optically transparent. A wide variety of pressure sensitive adhesive compositions are suitable. In some embodiments, the pressure sensitive adhesive is optically clear. The pressure sensitive adhesive component can be any material that has pressure sensitive adhesive properties. Additionally, the pressure sensitive adhesive component can be a single pressure sensitive adhesive or the pressure sensitive adhesive can be a combination of two or more pressure sensitive adhesives.

Suitable pressure sensitive adhesives include, for example, those based on natural rubbers, synthetic rubbers, styrene block copolymers, polyvinyl ethers, poly(meth)acrylates (including both acrylates and methacrylates), polyolefins, silicones, or polyvinyl butyral.

The optically clear pressure sensitive adhesives may be (meth)acrylate-based pressure sensitive adhesives. Useful alkyl(meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic pressure sensitive adhesives are derived from, for example, at least one alkyl (meth)acrylate ester monomer such as, for example, isooctyl acrylate, isononyl acrylate, 2-methyl-butyl acrylate, 2-ethyl-n-hexyl acrylate and n-butyl acrylate, isobutyl acrylate, hexyl acrylate, n-octyl acrylate, n-octyl methacrylate, n-nonyl acrylate, isoamyl acrylate, n-decyl acrylate, isodecyl acrylate, isodecyl methacrylate, 4-methyl-2-pentyl acrylate and dodecyl acrylate; and optionally one or more comonomer component such as, for example, (meth)acrylic acid, vinyl acetate, N-vinyl pyrrolidone, (meth)acrylamide, isobornyl(meth) acrylate, a vinyl ester, a fumarate, a styrene macromer, alkyl maleates and alkyl fumarates (based, respectively, on maleic and fumaric acid), or combinations thereof.

In certain embodiments, the poly(meth)acrylic pressure sensitive adhesive is derived from between about 0 and about 20 weight percent of acrylic acid and between about 100 and about 80 weight percent of at least one of isooctyl acrylate, 2-ethyl-hexyl acrylate or n-butyl acrylate composition.

Typically the adhesive layer has a thickness of 10-200 micrometers. In some embodiments, the adhesive layer has a thickness of 10-100 micrometers or even 25-75 micrometers (1-3 mils).

The overlaminate films of this disclosure have a number of desirable properties. The fluorochemical-containing coating, besides providing acid resistance also provides resistance to staining and other weathering effects. The materials of the carrier film are typically matched to the materials of the graphic substrate. In some embodiments, the carrier film and the graphic substrate are both vinyl films. The vinyl overlaminate carrier film has desirable flexibility, which permits the overlaminate film to have an elongation at room temperature of at least 50%. This elongation of the overlaminate film can be achieved without significant cracking or other deformations of the fluorochemical-containing coating of the overlaminate film.

The acid resistance of the overlaminate films of this disclosure can be modeled in a variety of different ways. One condition that it is desirable to model is that of circumstances where the graphic articles are exposed to acid dew. As described above, in some polluted environments, acidic dew can form on exposed surfaces during the nighttime hours when air temperatures decrease. The dew can cling to the surface for long periods of time, for example, until the dew evaporates, and can cause staining of the surface. When the surface contains a graphic article, such as a motor vehicle graphic, the acid dew staining can be aesthetically unpleasing. The Stain Resistance Test test method presented in the Examples section is designed to mimic this phenomenon.

A variety of different techniques may be employed to prepare the graphic articles of this disclosure. The entire graphic article may be assembled in one location or different portions of the assembly process may be done at different locations at different times.

Typically an overlaminate film that has a fluorochemical-containing coating on one major surface and an adhesive layer on the other major surface is laminated to a graphic substrate. As described above, a wide variety of graphic substrates are suitable. In some embodiments, the graphic substrate is a graphic film article. The graphic film article may be prepared in the same place and at the same time as the overlaminate film, or the graphic film article may be prepared in a different location or at a different time from the overlaminate film. For example, a graphic article user could obtain a graphic film such as the SCOTCHCAL Gloss Overlaminate 8518 commercially available from 3M Company, St. Paul, Minn. These films contain an adhesive layer and release liner on one major surface and an ink receptive layer on the other major surface. The user can print a desired graphic image or design on the graphic film using a relatively inexpensive and commercially available printing equipment. An overlaminate film, such as described above, can then be laminated over the printed image to generate a graphic article.

Alternatively, a graphic article can be prepared in a single location and time in a continuous process in which a graphic film is supplied or generated, an image is generated upon or within the graphic film and the overlaminate film is laminated to the graphic film. The images described herein can be formed on the graphic film via any useful printing method such as, for example, a solvent based or water based ink jet printing process, a thermal mass transfer printing process, electrostatic printing, gravure printing, offset printing, screen printing, and the like.

Graphic substrates other than graphic films can also be used in this process. For example, rigid or semi-rigid graphic substrates (such as for example plastic parts, glass plates, metal sheets, etc) can have the overlaminate film laminated to their surfaces to prepare graphic articles.

The overlaminate films may be prepared by various techniques. The carrier film contains two different coatings, a fluorochemical-containing coating and an adhesive coating. Additionally, the adhesive coating may optionally be covered by a release liner. Examples of suitable release liners are described above.

The coatings on the carrier film can be coated simultaneously or sequentially in any order. Examples of simultaneous coating techniques include, for example, simultaneous hot melt extrusion. In this technique the different layers are extruded from different extruders as separate streams into a die and combined to form a multi-layer article. For example, a vinyl polymer could be extruded to form the carrier film, a hot melt coatable pressure sensitive adhesive could be extruded to form the adhesive layer and a hot melt coatable fluorochemical-containing material could be extruded to form the fluorochemical-containing layer. In this way the three layer overlaminate film could be produced in a single step.

The coatings on the carrier film can also be applied sequentially to a pre-made carrier film. Both solventless and solvent-borne (including water-borne) coating techniques are within the scope of this disclosure. Solventless techniques include hot melt coating techniques. Solvent-borne coating techniques include for example, spraying, knife coating, notch coating, reverse roll coating, gravure coating, dip coating, bar coating, flood coating, or spin coating. Either or both of the fluorochemical-containing layer and/or the adhesive layer can be coated as a solvent-borne or water-borne coating. Typically, after coating the layers are dried either at room temperature or at elevated temperature such as in an oven, such as a forced air oven.

Additionally, the overlaminate film can be prepared by coating a solution or dispersion of the fluorochemical-containing material on a release liner and drying the coating to form a fluorochemical-containing layer. A coating of a vinyl organosol or plastisol can be applied and fused to this layer to generate a vinyl carrier film with a fluorochemical-containing coating. The adhesive layer can then be coated to the non-coated side of the vinyl carrier film.

In one embodiment, an overlaminate film was prepared comprising SCOTCHCAL Gloss Overlaminate 8518 commercially available from 3M Company, St. Paul, Minn. as the carrier film with a fluorochemical-containing coating comprising 25 weight % fluoropolymer and 75 weight % acrylate resin.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

| Abbreviation or Trade Designation | Description |
|---|---|
| Film-1 | A 0.05 mm (0.002 in.) thick clear, cast vinyl film having a 0.03 to 0.05 mm (0.001 to 0.002 inch) thick clear pressure sensitive adhesive, available from 3M Company, St. Paul, Minnesota as "SCOTCHCAL Gloss Overlaminate 8518". |
| Coating Solution 1 | A blend of Fluoropolymer-1 and Acrylate-1. See description of preparation below. |
| Film-2 | A 51 micrometer (0.002 inches) thick, white colored, cast vinyl, graphic film having a repositionable pressure sensitive adhesive with a nominal thickness of 25 to 51 micrometers (0.001 to 0.002 inches) and containing air release channels, available from 3M Company, St. Paul, MN as "CONTROLTAC 180C-10". |
| Aluminum Panel | An etched and desmutted aluminum panel measuring 15.2 m × 15.2 cm × 1.58 mm (6 × 6 × 0.063 inches), obtained as 6061T6, ED-6-6, from Q-Panel Lab Products, Cleveland, OH. |
| Cleaning Solution | KLEEN TRAC 1A, a low pH liquid carwash presoak solution, available from Simoniz USA, Bolton, CT. |
| Fluoropolymer-1 | A copolymer of vinylidene fluoride and chlorotrifluoroethylene (approximately 1:1 weight ratio) with a Tg of about 25° C., obtained from Dyneon, St. Paul, MN as "KF-3700". |
| Acrylate-1 | A high molecular weight (ca. 410 million) poly(methyl methacrylate) polymer having a glass transition temperature of 105° C. and an elongation at break of 1% (23°, 50% RH), available from Lucite International, Incorporated, Cordova, TN as "ELVACITE 2041". |
| Stabilizer-1 | A liquid UV absorber of the hydroxyphenylbenzotriazole class containing 50% beta-[3-(2-H-Benzotriazole-2-yl)-4-hydroxy-5-tert.butylphenyl]-propionic acid}poly(ethylene glycol) 300-ester, 38% bis{beta-[3-(2-H-Benzotriazole-2-yl)-4-hydroxy-5-tert.butylphenyl]-propionicacid}-poly(ethylene glycol) 300-ester, and 12% polyethylene glycol, available from Ciba Specialty Chemicals, Incorporated, BASF, Hawthorne, NY as "TINUVIN 1130". |
| Stabilizer-2 | A hindered amine light stabilizer, available from Ciba Specialty Chemicals, Incorporated, BASF, Hawthorne, NY as "TINUVIN 292". |
| MEK | methyl ethyl ketone |
| PMA | 1-methoxy-2-propanol acetate |
| pbw | parts by weight |

Test Methods

Stain Resistance Test

The degree of staining of multilayer graphic articles was measured for multilayer articles mounted on aluminum panels. The aluminum panel with the multilayer article mounted thereon was placed on a hot plate set at 71° C. (160° F.) with the multilayer article facing upward (exposed). A drop of tap water was placed on the outer surface of the overlaminate film of the multilayer article, followed by placing a drop of Cleaning Solution on top of the drop of water. This test sample was left on the heated hot plate for between 16 and 24 hours after which the outer surface of the overlaminate film of the multilayer article was rinsed with tap water. The surface was then optically evaluated for stain resistance over a wavelength range of 400 to 700 nanometers (nm) using a calibrated Gretag-MacBeth COLOR-EYE 7000A Spectrophotometer (Gretag-MacBeth, Windsor, N.Y.) equipped with a pulse Xenon light source. Samples of the multilayer articles were evaluated three times at the position where the spot of cleaning solution had been located. Between measurements the sample was moved slightly in order to obtain results from different locations within the previously spotted area. The average of the three measurements was calculated. The results for all examples were normalized with respect to Comparative Example C1 which was assigned a value of 100. A value of lower than 100 indicates that the film is more stain resistant than Comparative Example C1.

PREPARATIVE EXAMPLES

Preparation of Coating Solution 1

The reagents in the amounts shown in Table 1 below were thoroughly mixed to form a uniform solution having a viscosity of approximately 200 centipoise which was then immediately used to coat a sample of Film-1 as described further below.

TABLE 1

| Reagent | Amount (pbw) |
|---|---|
| Fluoropolymer-1 | 2.5 |
| Acrylate-2 | 7.5 |
| MEK | 40 |
| PMA | 50 |
| Stabilizer-1 | 0.4 |
| Stabilizer-2 | 0.4 |

Example 1 and Comparative Example C1

For Example 1, an overlaminate film sample was prepared by taking a sample of Film-1 and coating with Coating Solution 1 using an RDS #3 coating rod (available from RD Specialties, Webster, N.Y.) and dried at 66° C. (150° F.) for 2 hours. Comparative Example C1 was Film-1 without a coating. The coating solution solids level (approximately 11%) were sufficient to give a calculated coating thickness of approximately 3 to 5 micrometers after drying.

The release liner was removed from a piece of coated samples of Film-1 (Example 1) and the uncoated sample of Film-1 (Comparative Example C1) and the exposed adhesive layer of each was joined to the vinyl film side of a sample of Film-2 at room temperature (ca. 22° C., 72° F.) using a rubber nip roll system having a roll length of 77.5 centimeters (cm) (30.5 inches), a diameter of 7.62 cm (3 inches), and set at a pressure of 275.8 kiloPascals (40 pounds per square inch) to provide multilayer articles. Both the overlaminate samples and the Film-2 film layers measured between 15.2 cm (6 in.) square and 30.5 cm (12 in.) square. The release liners were removed from Film-2 and the multilayer articles were held in front of an open forced air oven set at 66° C. (150° F.) for approximately two minutes, and stretched 50% as determined by lines previously marked on the outer surface of the multilayer article and a supporting aluminum panel. The stretched film was immediately adhered to the aluminum panel and rubbed down using a small rubber roller and hard hand pressure to ensure intimate contact. The aluminum panel with the multilayer article mounted thereon was evaluated for stain resistance as described in the Test Method above. The results are presented in Table 2.

TABLE 2

| Example | Film | Coating Solution | Stain Test Result |
|---|---|---|---|
| C1 | Film-1 | None | 100 |
| 1 | Film-1 | 1 | 20 |

What is claimed is:

1. An article comprising:
    a graphic substrate; and
    an overlaminate film laminated to the graphic substrate, the overlaminate film comprising:
        a transparent film layer comprising a vinyl film layer, wherein the vinyl film layer comprises polyvinyl chloride, a blend containing polyvinyl chloride, or plasticized polyvinyl chloride and having a first major surface and a second major surface;
        a fluorochemical-containing acid-resistant layer coated on at least a portion of the first major surface of the transparent film layer, wherein the fluorochemical-containing acid resistant layer comprises a blend of at least one fluoropolymer and at least one acrylate resin; and
        a pressure sensitive adhesive layer directly coated on at least a portion of the second major surface of the transparent film layer, wherein the overlaminate film has an elongation at room temperature of at least 50%; and wherein the fluorochemical-containing acid resistant layer comprises:
            15-60 weight % of the at least one fluoropolymer comprising a copolymer of 40-80 weight % vinylidene fluoride and 20-60 weight % of at least one copolymerizable fluoromonomer; and
            40-85 weight % of the at least one acrylate resin comprising 80-100 weight % methyl methacrylate and 0-20 weight % of at least one copolymerizable vinyl monomer.

2. The article of claim 1, wherein the graphic substrate comprises a graphic film article.

3. The article of claim 2, wherein the graphic film article comprises a motor vehicle graphic.

4. The article of claim 2, wherein the graphic film article is can be attached to a motor vehicle.

5. The article of claim 2, wherein the graphic film article comprises a vinyl film.

6. The article of claim 1, wherein the transparent film layer has a thickness of from about 10 to about 255 micrometers.

7. The article of claim 1, wherein the fluorochemical-containing acid resistant layer has a thickness of from about 1 to about 75 micrometers.

8. A method of preparing a graphic article comprising:
    providing a graphic substrate;
    providing an overlaminate film wherein the overlaminate film comprises:
        a phrase "transparent layer comprising a vinyl film layer, wherein the vinyl film layer comprises polyvinyl chloride, a blend containing polyvinyl chloride; or plasticized polyvinyl chloride and having" a first major surface
        and a second major surface;
        a fluorochemical-containing acid resistant layer coated on at least a portion of the first major surface of the transparent film layer, wherein the fluorochemical-containing acid resistant layer comprises a blend of at least one fluoropolymer and at least one acrylate resin; and
        an pressure-sensitive adhesive layer directly coated on at least a portion of the second major surface of the transparent film layer, wherein the overlaminate film has an elongation at room temperature of at least 50%;
        and wherein the fluorochemical-containing acid resistant layer comprises: 15-60 weight % of the at least one fluoromonomer comprising a copolymer of 40-80% weight vinylidene fluoride and 20-60 weight % of at least one copolymerizable fluoromonomer; and 40-85 weight % of the at least one acrylate resin comprising 80-100 weight % methyl methacrylate and 0-20 weight % of at least one copolymerizable vinyl monomer the overlaminate film to the graphic substrate to form the graphic article.

9. The method of claim 8, wherein the graphic substrate comprises a graphic film article.

10. The method of claim 9, wherein the graphic film article comprises a vinyl film.

11. The method of claim 8, wherein the transparent film layer has a thickness of from about 10 to about 255 micrometers.

12. The method of claim 8, wherein the fluorochemical-containing acid resistant layer has a thickness of from about 1 to about 75 micrometers.

13. The method of claim 8, wherein providing the graphic substrate comprises:
    providing a multi-layer graphic film comprising a base vinyl film, an adhesive layer coated on a surface of the base vinyl film and a release liner attached to the adhesive layer; and
    printing on the multi-layer graphic film to provide a graphic image or design.

* * * * *